United States Patent [19]
Rubin et al.

[11] Patent Number: 5,437,013
[45] Date of Patent: * Jul. 25, 1995

[54] METHOD AND SYSTEM FOR NETWORK COMMUNICATIONS USING RAW MODE PROTOCOLS

[75] Inventors: Darryl E. Rubin; Kenneth E. Masden, both of Redmond; John W. King, Kirkland, all of Wash.

[73] Assignee: Microsoft Corporation, Redmond, Wash.

[*] Notice: The portion of the term of this patent subsequent to Nov. 23, 2010 has been disclaimed.

[21] Appl. No.: 112,844

[22] Filed: Aug. 26, 1993

Related U.S. Application Data

[63] Continuation of Ser. No. 12,629, Feb. 2, 1993, Pat. No. 5,265,261, which is a continuation of Ser. No. 394,103, Aug. 14, 1989, abandoned.

[51] Int. Cl.$^6$ .............................. G06F 13/00
[52] U.S. Cl. .......................... 395/200; 364/DIG. 1; 364/242.94; 364/247.2; 364/260.1; 364/284.3; 364/284.4
[58] Field of Search ........................................ 395/200

[56] References Cited

U.S. PATENT DOCUMENTS

| | | | |
|---|---|---|---|
| 4,343,042 | 8/1982 | Schrock et al. | 455/5 |
| 4,445,176 | 4/1984 | Burk et al. | 364/200 |
| 4,495,572 | 1/1985 | Bosen | 364/200 |
| 4,543,627 | 9/1985 | Schwab | 364/DIG. 1 |
| 4,941,089 | 7/1990 | Fischer | 364/DIG. 1 |
| 4,949,248 | 8/1990 | Caro | 364/200 |
| 5,077,655 | 12/1991 | Jinzaki | 395/200 |

OTHER PUBLICATIONS

Hurwicz, "MS-DOS 3.1 Makes it easy to use IBM PCs on a network," *Data Communications*, vol. 14, No. 12, 1985, pp. 223–224, 227–230, 233–237.

Currie, *LANs Explained: A Guide to Local Area Networks*, Ellis Horwood Limited, Chichester, England, 1988, pp. 144–154.

Tanenbaum, *Computer Networks*, 2nd ed., Prentice-Hall, New Jersey, 1989, pp. 14–21.

Chou, (ed.) *Computer Communications*, vol. II, *Systems and Applications*, Prentice-Hall, New Jersey, 1985, pp. 134–135.

Sherer, "Design of the 3Com# + Local Area Network File System," *Digest of Papers*, Thirty-Second IEEE Computer Society International Conference, San Francisco, California, Feb. 23–27, 1987, pp. 1–5.

*Primary Examiner*—Eddie P. Chan
*Attorney, Agent, or Firm*—Seed and Berry

[57] ABSTRACT

A method and system for sending data from a first computer through a communications line to a second computer. The second computer includes a redirector, a transport, a data buffer, and an application program. The method and system provides the transport with a read request to send data from the first computer to the second computer, and with a receive network control block which directs the transport to store the next data it receives directly in the data buffer. The transport sends the read request to the first computer. The first computer stores the data identified by the read request in a data block without a header. The first computer transmits the data block over the communications line to the transport. Using information contained in the network control block, the transport stores the requested data without the header directly in the data buffer.

16 Claims, 4 Drawing Sheets

METHOD AND SYSTEM FOR NETWORK COMMUNICATIONS USING RAW MODE PROTOCOLS

CROSS-REFERENCE TO RELATED APPLICATION

This application is a continuation of U.S. patent application Ser. No. 08/012,629, filed Feb. 2, 1993, now U.S. Pat. No. 5,265,261, which is a continuation of U.S. patent application Ser. No. 07/394,103 filed Aug. 14, 1989, which is now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

TECHNICAL FIELD

This invention relates generally to a computer system for transmitting data on a computer network, and more specifically, to a method and system for transmitting data in raw mode.

BACKGROUND OF THE INVENTION

Local Area Networks (LANs) are very popular means for interconnecting computers, especially personal computers. These computers are interconnected, in part, so that data may be electronically transferred from one computer to another and so that users can share resources such as files.

Several different type computers and computer operating systems can exist on a given network. For example, some of the computers can run Microsoft's OS/2 operating system and other computers can run a Unix-based operating system. These different computer systems need to transfer information in a protocol. The use of protocols in diverse computer systems is somewhat analogous to the use of the transmission protocols of AM and FM radio. An AM radio can only receive AM protocol signals, an FM radio can only receive FM protocol signals. Similarly, diverse computer systems cannot communicate unless they use the same protocol.

One such protocol for computer system file sharing is defined in the document entitled "Microsoft Networks/OpenNET FILE SHARING PROTOCOL," which is available from Intel Corporation as Intel Part Number 138446, and is hereby incorporated by reference. Systems that use that protocol can obtain or provide remote file services in a network environment. This protocol is referred to as the System Message Block (SMB) protocol because the protocol defines how data is to be packaged with SMB headers to be transmitted on the network. The protocol defines a server which provides file services and a consumer that accesses those services.

The SMB protocol defines how typical file access functions are to be accomplished on a network. For example, to read data from a file the consumer formats an SMB-read request block and then sends the block to the server. When the server receives the request, it retrieves the data from its file system, formats an SMB-read data response message, and sends the message with the data to the consumer. The consumer would then repeat this process for the next part of the file to be read.

FIG. 2A shows how a consumer receives data from an SMB-read. In this example, an application program makes a call to the operating system requesting a file read and passing the address of the buffer 21 for the requested data. The kernel of the operating system determines that a file access is required and passes the call to the redirector, if the file is stored on network device.

The redirector effects the read request by calling the transport system and requesting the data be stored in the SMB-buffer 23. The SMB-buffer 23 may not be large enough to store the entire data requested. The application program may request a large portion of the file, for example, 64K bytes. A typical size of the SMB-buffer data area may be 4K. Consequently, the redirector will need to send 16 requests for 4K of data each. For each of the 16 requests, the redirector initializes a network control block (NCB) to point to an SMB-buffer that contains the SMB-read command. The NCB also contains a pointer to the SMB-buffer in which to store the requested data. The redirector then calls the transport system.

The transport system transports the SMB-read command to the file server. When the response to the read is received, the transport system stores the SMB data directly in the SMB buffer of the redirector and returns to the redirector. The received SMB data contains both header information and data.

The redirector then stores the 4k bytes of SMB-buffer data, not the header, in the application buffer. The redirector then proceeds to send an SMB request to get the next 4k of data and when it receives the data it copies the data into the appropriate location in the application buffer. This process continues until the entire 64K of data is received.

The use of the prior message protocol has several disadvantages. First, there is a high overhead associated with formatting and sending NCB and SMB block. Second, the use of small blocks is inefficient to transfer large blocks of data. Third, there is duplicate copying occurring as the transport system copies the data to the SMB buffer and then the redirector copies the data to the application buffer. It would be desirable to have a method and system for implementing a protocol in which data can be transferred without these disadvantages.

SUMMARY OF THE INVENTION

It is an object of the present invention to provide a method and system for sending a write request on a network and then sending the data directly from the application buffer to the network.

It is another object of the present invention to provide a method and system for receiving data from a network and storing the data directly in the application buffer.

It is another object of the present invention to provide a method in a computer system of requesting a read raw block transfer and a write raw block transfer in an efficient format.

These and other objects, which will become apparent as the invention is more fully described below, are obtained by an improved method and system for communication between a server and consumer.

DETAILED DESCRIPTION OF THE INVENTION

The present invention provides a method and system for transmitting data on a network in raw mode. In a preferred embodiment, data is transmitted on the network without the overhead of the SMB header and the data is stored directly into an application buffer, rather than stored into an SMB buffer.

Figure 1:
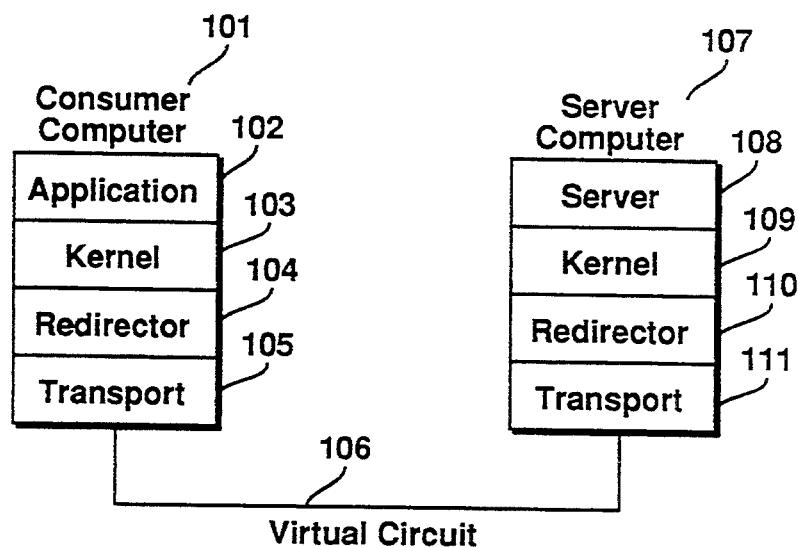
FIG. 1 shows a consumer and server along with the different system layers.

FIG. 1 shows the system layers for a consumer computer 101 that is connected to a server computer 107 through a virtual circuit (VC) 106. In a preferred embodiment, the redirector 104 implements an SMB protocol and the transport system 105 implements the network communication.

When data is transmitted in raw mode, the SMB-header blocks are not sent with the data. Thus, data can be written directly into an application buffer (not shown). However, the redirector 104 preferably ensures that no requests are pending on the virtual circuit 106 before raw data is sent. Otherwise, the redirector 104 would not know whether the data is the raw data or is data from another request because some data is sent directly to the application buffer.

In a preferred embodiment, the redirector 104 calls the read block raw and write block raw subroutines to implement the read raw and write raw protocols, respectively.

Read Block Raw

Figure 2A:
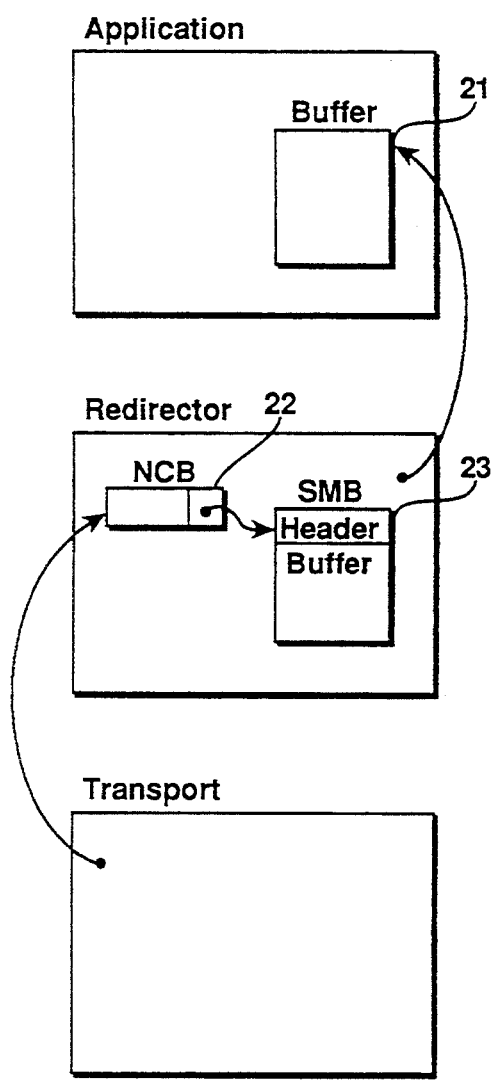
FIG. 2A shows the receiving of the read data in prior systems.
Figure 2B:
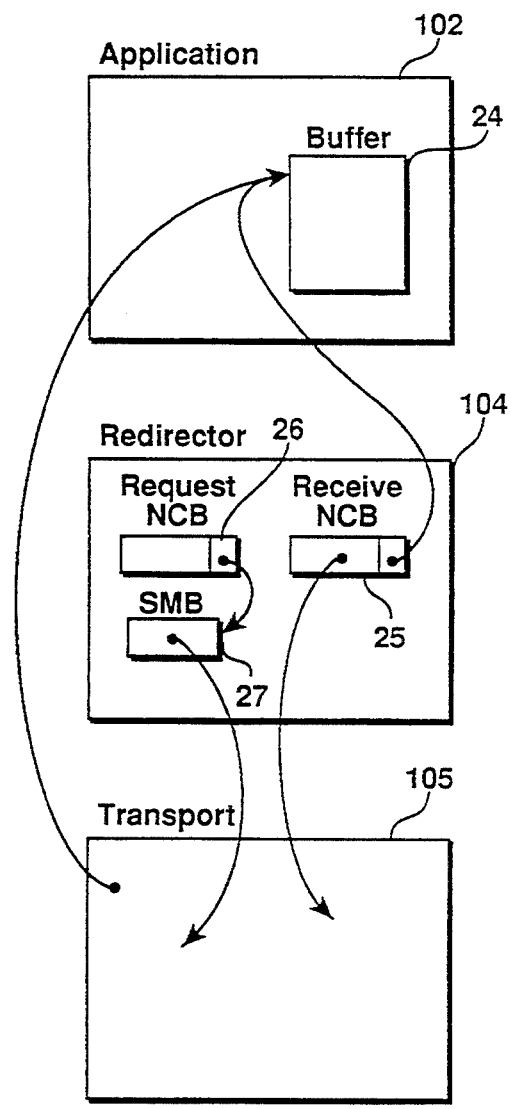
FIG. 2B shows the receiving of the read data in a preferred embodiment of the present invention.

In a preferred embodiment of the present invention, the redirector 104 implements the read raw protocol. The implementation is generally transparent to the application program 102, the kernel 103, and the file system, except for improved performance. Referring to FIG. 2B, an application program makes a call to the operating system requesting a file read and passing the address of the buffer 24 for the requested data. The kernel 103 (not shown) of the operating system invokes the redirector 104. The redirector 104 effects the read request by calling the transport 105 and requesting the data be stored directly in the application buffer 24. The redirector 104 initializes a receive network control block (NCB) 25 to receive data into the buffer 24. When the transport 105 receives the next data from the server computer 107 (not shown), the transport system will store the data directly into the application buffer 24. The redirector 26 initializes the request NCB 26 to point to an SMB buffer 27 that contains the SMB read block raw command. The redirector 104 then requests the transport system 105 to send the request on the network to the server computer 107 (not shown). The receive NCB 25 is sent to the transport 105 before the request NCB 26 is sent to the server computer 107 (not shown) to ensure that a fast server computer 107 will not send the raw data before the consumer computer 101 (not shown) is ready to receive it.

Appendix 1 contains a preferred format of the SMB read block raw format along with a description of how the consumer and server interact.

Figure 3:
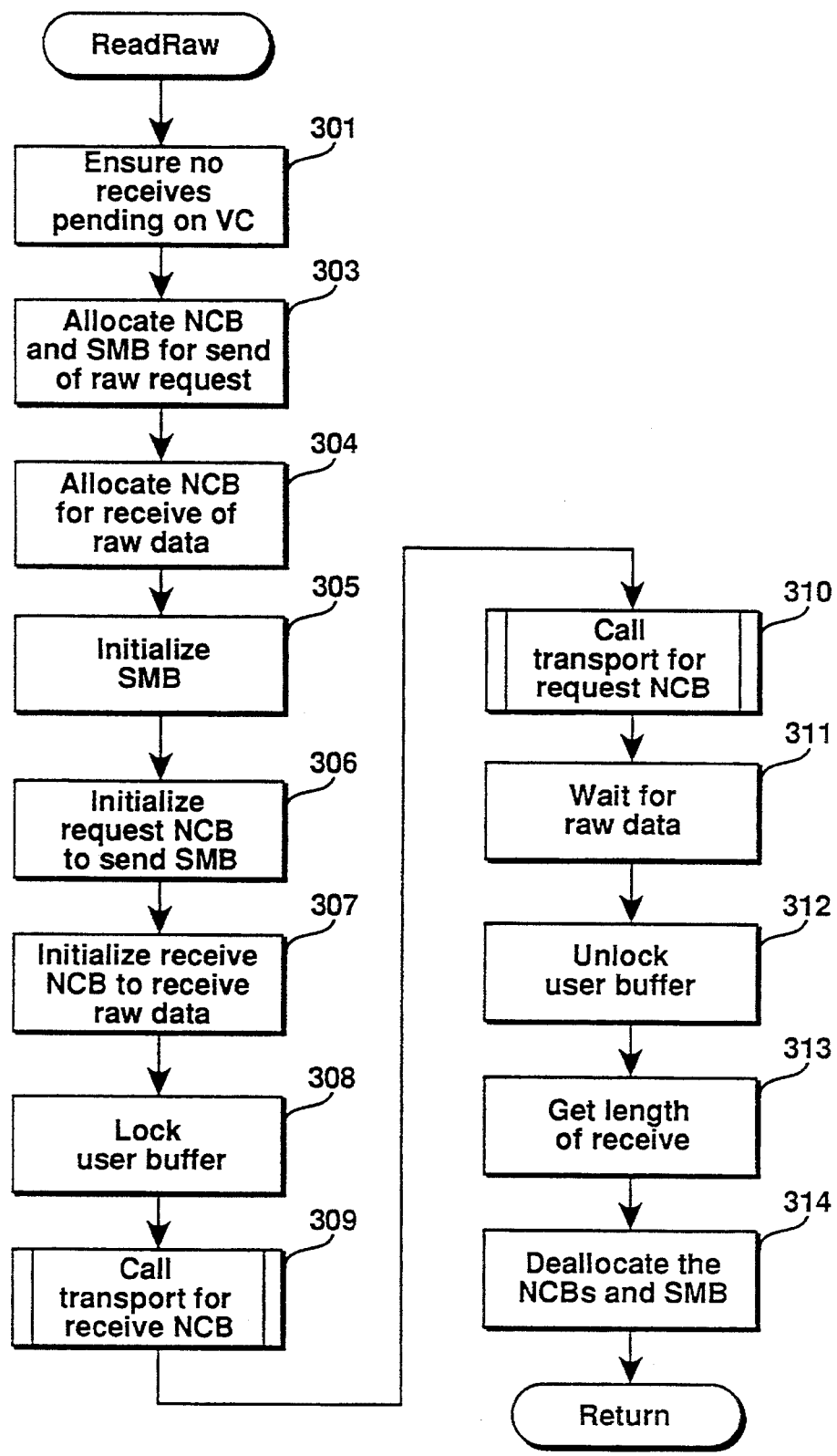
FIG. 3 shows a flow diagram of the read raw subroutine.

FIG. 3 is a flow diagram of a read raw subroutine that is called by the redirector. In block 301, the system ensures that consumer has no outstanding requests on the virtual circuit (VC) and that the consumer will not issue any requests for the duration of the read raw request. In block 303, the system allocates an NCB and an SMB data structure for the sending of the raw request. In block 304, the system allocates an NCB for the receiving of the raw data. In block 305, the system initializes the SMB header data and the SMB raw request variables that are shown in Appendix 1. In block 306, the system initializes the request NCB to send the SMB raw request. In block 307, the system initializes the receive NCB to receive raw data. In block 308, the system locks the user buffer, which ensures that the buffer will stay in memory until unlocked. In block 309, the system passes to the transport system the receive NCB, which tells the transport system to store the next data it receives directly in the user buffer. In block 310, the system passes the transport system the request NCB. The transport system transmits to the request SMB to the server. In block 311, the system waits until the raw data is received. In block 312, the system unlocks the user buffer. In block 313, the system gets the length of the raw data received from the transport system. In block 314, the system deallocates the NCBs and the SMB and then the subroutine returns.

Write Block Raw

In a preferred embodiment of the present invention, the redirector implements the write raw protocol. The implementation is generally transparent to the application program, the kernel, and the file system, except for improved performance. An application program makes a call to the operating system requesting to write data in raw mode and passing the address of the data buffer that contains the data. The kernel of the operating system invokes the redirector. The redirector effects the write by calling the transport system and sending a write raw request to the server. The redirector first initializes a request NCB to point to an SMB buffer that contains the SMB write block raw command. When the server responds with a verification that it is ready to receive the raw data, the redirector then is ready to send the data. The redirector then initializes a send NCB that points to the application data buffer to write. The redirector then passes the send NCB to the redirector to send the data to the server.

Appendix 2 contains a preferred format of the SMB write block raw format along with a description of how the consumer and server interact.

Figure 4:
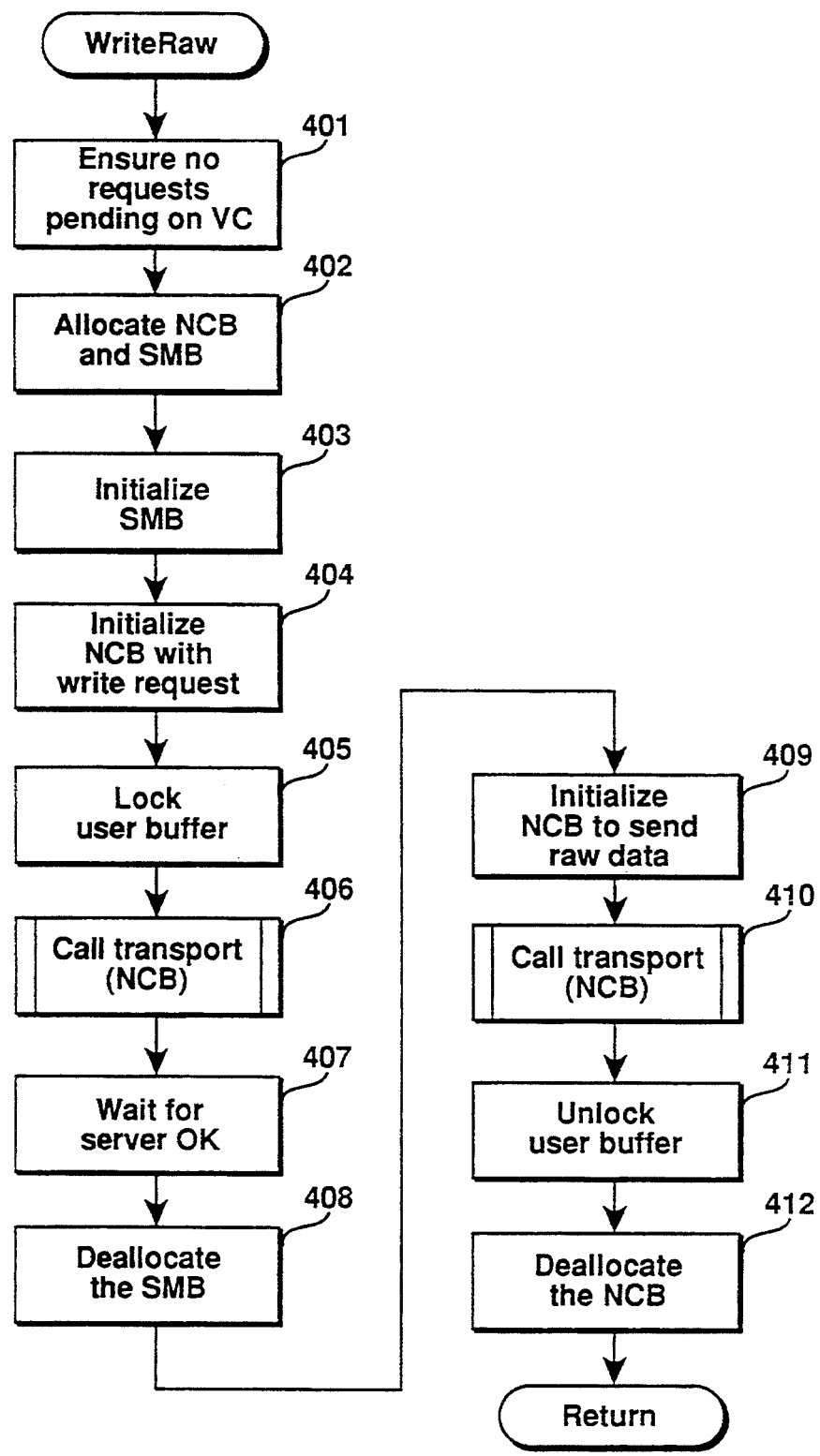
FIG. 4 shows a flow diagram of the write raw subroutine.

FIG. 4 is a flow diagram of the write raw subroutine that is called by the redirector. In block 401, the system ensures that the consumer has no outstanding requests on the virtual circuit (VC) and that the consumer will not issue any requests for the duration of the write raw request. In block 402, the system allocates an NCB and an SMB. The system uses the same NCB for the write request and the write. In block 403, the system initializes the SMB header and the SMB write raw variables that are defined in Appendix 2. In block 404, the system initializes the NCB block to send the SMB to the server. In block 405, the system locks the user buffer, which ensures that the buffer will remain in memory at that location. In block 406, the system passes the NCB to the transport system, which transmits the SMB to the server. In block 407, the system waits for the server to acknowledge that it is ready to receive the raw data. In block 408, the system deallocates the SMB; the NCB is not deallocated at this point as it is used to send the raw data. In block 409, the system initializes the NCB to send the raw data; the NCB contains a pointer to the user buffer. In block 410, the system passes the NCB to the transport system, which transmits the raw data to the server. In block 411, the system unlocks the user buffer. In block 412, the system deallocates the NCB and the subroutine returns.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

What is claimed is:

1. A computer implemented method in a computer system for transferring data on a network from a first computer to a second computer connected by a virtual circuit, the second computer having an application program, a transport implementing network communications and a redirector implementing a system message block protocol, the application program having access to a data buffer, the method comprising the steps of:
    under control of the redirector,
        initializing a network control block; and
        directing the transport of the second computer to store the data that it receives next directly in the data buffer pointed to by the network control block instead of a system message block buffer in the redirector;
    under control of a transport of the first computer, transferring the data without a system message block header containing information about the data from the first computer over the virtual circuit to the transport of the second computer; and
    under control of the transport of the second computer, and upon receiving the transferred data, storing the received data directly into the data buffer of the application program.

2. The method of claim 1, including the step of under control of the redirector, ensuring that no requests to transfer data from the first computer to the second computer are pending so that data without a system message block header can be transferred from the first computer to the second computer.

3. A computer system for transferring data on a network from a first computer to a second computer connected by a virtual circuit, the first computer having a system message block in a redirector which stores a write request command, the first computer having the redirector implementing a system message protocol and a transport implementing network communications, the second computer having a memory, a portion of the memory of the second computer for storing the data transferred from the first computer, the system comprising:
    a kernel of the first computer for invoking the write request command, the write request command indicating that data is to be transferred from the first computer to the second computer without a system message block header;
    means in the redirector for initializing and transferring a network control block to the transport, the network control block pointing to the write request command stored in the system message block buffer to be transferred;
    means in the transport for sending an indication of the write request command from the first computer to the second computer through the virtual circuit;
    means in the transport for receiving a message from the second computer indicating that the second computer is ready to receive the data; and
    means in the redirector for initializing and transferring a network control block to the transport, the network control block pointing to the data to be transferred;
    means in the transport for retrieving the data pointed to by the network control block instead of a system message block buffer in the redirector and transferring the retrieved data without a system message block header to the second computer in response to the message.

4. The system of claim 3, including means for ensuring that no requests to transfer data are pending on the virtual circuit before transferring the data.

5. The system of claim 3, including:
    means for locking the data of the first computer to ensure that it is available to be transferred.

6. A computer system for sending data on a network from a first computer through a virtual circuit to a second computer, the second computer having an application program requesting a read from the first computer, having a redirector implementing a system message block protocol, and having a transport implementing network communications, the application program having access to a data buffer, the system comprising:
    means in the redirector for allocating and initializing a receive network control block for directing the transport to store the next data it receives directly in the data buffer instead of a system message block buffer in the redirector;
    means in the redirector for transferring to the transport both a read request to read the requested data from the first computer and the receive network control block;
    means in the transport for sending the read request through the virtual circuit to the first computer;
    means for storing the requested data in a data block without a message block header in response to the read request;
    means for transferring the requested data without a message block header from the first computer through the virtual circuit to the transport of the second computer; and
    means, using information contained in the receive network control block, for storing the transferred data without a message block header directly from the transport of the second computer to the data buffer instead of the system message block buffer in the redirector.

7. The system of claim 6 wherein the means in the redirector for transferring includes means for ensuring that no requests to transfer data through the virtual circuit are pending so that only the requested data without a header is transferred on the virtual circuit.

8. The system of claim 6, including:
    means for locking the data buffer before sending the read request to ensure that the data buffer remains accessible until the read request is satisfied.

9. A computer system for transferring data on a network from a first computer to a second computer connected by a virtual circuit, the second computer having an application program and having a transport implementing network communications, the application program having access to a data buffer, the system comprising:

a redirector of the second computer for implementing a system message block protocol and initializing a receive network control block for directing the transport to store the next data it receives directly in the data buffer pointed to by the receive network control block instead of a system message block buffer in the redirector;

means for transferring to the transport the receive network control block;

a kernel of the first computer for storing data to be transferred to the second computer in a data block without a system message block header;

means for transferring the data block without a system message block header from the first computer over the virtual circuit to the transport; and means in the transport for storing the transferred data block directly into the data buffer instead of the system message block buffer in the redirector.

10. The system of claim 9 wherein the redirector includes means for ensuring that no requests to transfer data through the virtual circuit are pending so that only the requested data without a header is transferred on the virtual circuit.

11. The system of claim 9, including:

means for locking the data buffer before sending the data block from the first computer to the transport to ensure that the data buffer remains accessible until the data block has been stored in the data buffer.

12. A computer system for sending data on a network from a second computer to a first computer, the computer system including a virtual circuit for concurrently sending multiple streams of data between the first computer and the second computer, the first and second computer implementing a message block protocol, the system comprising:

a data buffer;

a transport in the first computer for sending a read request from the first computer to the second computer, the read request specifying that the multiple streams of data without a system message block header are to be transmitted from the second computer to the first computer;

a redirector in the first computer for implementing a system message block protocol and ensuring, for each of the multiple streams of data, that no other requests to transmit data over the virtual circuit from the second computer to the first computer are pending so that only the stream of data without a system message block header is transmitted over the virtual circuit from the second computer to the first computer;

means in the redirector for initializing and transferring a network control block to the transport, the network control block for pointing to the data buffer;

means for transmitting, for each of the multiple streams of data, the data without a system message block header over the virtual circuit from the second computer to the first computer;

means in the transport for receiving, for each of the multiple streams of data, the data without a system message block header at the first computer; and means in the transport for storing, for each of the multiple streams of data, the received data without a system message block header directly in the data buffer pointed to by the network control block instead of a system message block buffer in the redirector.

13. The system of claim 12, including:

means for locking the data buffer before sending the read request so that each of the multiple streams of data can be stored directly in the data buffer.

14. A computer system for sending data on a network from a second computer to a first computer, the computer system including a virtual circuit for concurrently sending multiple streams of data between the first computer and the second computer, the first and second computer implementing a message block protocol, the system comprising:

a transport in the first computer for sending a raw mode read request from the first computer to the second computer, the raw mode read request specifying that the multiple streams of data without a system message block header are to be transferred from the second computer to the first computer; and a redirector in the first computer for implementing a system message block protocol and for initializing and transferring a network control block to the transport in the first computer, the network control block pointing to a data buffer;

for each of the multiple streams of data, means in the redirector for implementing a system message block protocol and reserving the communications path to ensure that only data for the raw mode read request is transferred over the virtual circuit;

a stream transport in the second computer for transferring, in response to the raw mode read request, the data without a system message block header over the virtual circuit from the second computer to the first computer; and a stream transport in the first computer for receiving the data without a system message block header at the first computer and storing the received data directly in the data buffer pointed to by the network control block instead of a system message block buffer in the redirector.

15. The computer system of claim 14, further comprising:

means for locking the data buffer before sending the raw mode read request to ensure that the data buffer remains accessible until the raw mode read request is satisfied.

16. A method implemented in a computer system for sending data from a second computer to a first computer, the computer system including a network communications path for sending multiple streams of data from the second computer to the first computer, the first computer having a redirector implementing a system message block protocol and having a transport implementing network communications, the method comprising the steps of:

under control of the redirector, initializing and transferring to the transport a network control block pointing to a buffer;

under control of the transport, sending a read request from the first computer to the second computer, the read request specifying that the streams of data without a system message block header are to be transmitted from the second computer to the first computer; and for each of the streams of data, ensuring that no requests to transmit data are pending so that the stream of data without a system message block header can be transmitted over the communications path from the second computer to the first computer;

transmitting over the communications path, to the first computer, the stream of data without a header; and under control of the transport, receiving at the first computer the stream of data transmitted without a system message block header over the communications path to the first computer and storing the received stream of data without a system message block header in the buffer pointed to by the network control block instead of a system message block buffer in the redirector.

* * * * *